United States Patent
Chan

(10) Patent No.: US 10,819,210 B1
(45) Date of Patent: Oct. 27, 2020

(54) POWER SUPPLY APPARATUS CAPABLE OF INCREASING FEEDBACK RESPONSE SPEED

(71) Applicant: Acer Incorporated, New Taipei (TW)

(72) Inventor: Tzu-Tseng Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/558,179

(22) Filed: Sep. 2, 2019

(30) Foreign Application Priority Data

Jun. 28, 2019 (TW) .............................. 108122891 A

(51) Int. Cl.
  H02M 1/00 (2006.01)
  H02M 3/00 (2006.01)

(52) U.S. Cl.
  CPC .............. H02M 1/00 (2013.01); H02M 3/00 (2013.01); *H02M 2001/0003* (2013.01); *H02M 2001/0025* (2013.01); *H02M 2001/0083* (2013.01)

(58) Field of Classification Search
  CPC .. H02M 2001/0003; H02M 1/00; H02M 3/00; H02M 3/06; H02M 2001/0025; H02M 2001/0083; H02M 2003/1566; H02M 3/156; H02M 3/158; H02M 3/335; H02M 3/33507; H02M 3/33523; H02M 3/33553
  See application file for complete search history.

(56) References Cited

U.S. PATENT DOCUMENTS

| | | | | |
|---|---|---|---|---|
| 4,626,976 A * | 12/1986 | Abe | ......................... | G05F 1/38 363/19 |
| 5,864,473 A * | 1/1999 | Slack | ................ | H02M 3/33546 363/21.08 |
| 2001/0054885 A1* | 12/2001 | Umemoto | ............... | H02M 1/36 323/282 |
| 2009/0185397 A1* | 7/2009 | Forghani-Zadeh | ..... | H02M 1/36 363/18 |
| 2009/0206810 A1* | 8/2009 | Chellamuthu | ........ | H02M 3/156 323/282 |

* cited by examiner

*Primary Examiner* — Gustavo A Rosario-Benitez
(74) *Attorney, Agent, or Firm* — JCIPRNET

(57) ABSTRACT

A power supply apparatus including a PWM signal generating circuit, a power conversion circuit, a voltage dividing circuit, a capacitor circuit, and a feedback compensation circuit is provided. The PWM signal generating circuit generates and modulates a PWM signal according to a feedback signal. The power conversion circuit converts an input voltage into an output voltage according to the PWM signal. The voltage dividing circuit divides the output voltage and generates a first voltage to a node. The capacitor circuit generates a second voltage to the node according to the output voltage in response to a voltage change of the output voltage. The feedback compensation circuit generates the feedback signal based on the first voltage and a reference voltage before the output voltage is ready. The feedback compensation circuit generates the feedback signal based on the second voltage and the reference voltage after the output voltage is ready.

8 Claims, 5 Drawing Sheets

US 10,819,210 B1

POWER SUPPLY APPARATUS CAPABLE OF INCREASING FEEDBACK RESPONSE SPEED

CROSS-REFERENCE TO RELATED APPLICATION

This application claims the priority benefit of Taiwan application serial no. 108122891, filed on Jun. 28, 2019. The entirety of the above-mentioned patent application is hereby incorporated by reference herein and made a part of this specification.

BACKGROUND OF THE INVENTION

1. Field of the Invention

The invention relates to a power supply technology, and in particular, to a power supply apparatus capable of increasing feedback response speed.

2. Description of Related Art

Generally speaking, in a power supply apparatus taking pulse width modulation (PWM) as basis, the power supply apparatus generally has a feedback circuit and a PWM controller. The feedback circuit can provide a feedback signal according to a change (no-load, light load, intermediate load and full load) of load of the power supply apparatus, and the PWM controller can correspondingly adjust a duty cycle or a frequency of a PWM signal according to the feedback signal, so as to stabilize an output voltage provided by the power supply apparatus.

Because the change of the load from no-load to heavy load is wide, the frequency change of the PWM signal is great, it is difficult to control the gain and the bandwidth of the feedback circuit, and then the feedback response speed of the feedback circuit fails to keep pace with the change of the PWM signal or the change of the load. Therefore, the problem that the output voltage is unsteady will occur.

SUMMARY OF THE INVENTION

In view of the above, the invention provides a power supply apparatus. The power supply apparatus may rapidly provide a feedback signal in response to a voltage change of an output voltage, so as to increase the feedback response speed, and thereby provide the output voltage that is stable.

The power supply apparatus disclosed by the invention includes a PWM signal generating circuit, a power conversion circuit, a voltage dividing circuit, a capacitor circuit, and a feedback compensation circuit. The PWM signal generating circuit is configured to generate and modulate a PWM signal according to a feedback signal. The power conversion circuit is coupled to the PWM signal generating circuit to receive the PWM signal, and configured to convert an input voltage into an output voltage according to the PWM signal. The voltage dividing circuit is coupled to the power conversion circuit to receive the output voltage, and configured to divide the output voltage to generate a first voltage to a node. The capacitor circuit is coupled to the power conversion circuit to receive the output voltage, and configured to generate a second voltage to the node according to the output voltage in response to a voltage change of the output voltage. The feedback compensation circuit is coupled to the node and the PWM signal generating circuit. The feedback compensation circuit generates the feedback signal based on the first voltage and a reference voltage before the output voltage is ready. The feedback compensation circuit generates the feedback signal based on the second voltage and the reference voltage after the output voltage is ready.

Based on the foregoing, in the power supply apparatus provided by the embodiment of the invention, the capacitor circuit may rapidly provide the second voltage to the feedback compensation circuit in response to the voltage change of the output voltage, so as to increase the feedback response speed of the power supply apparatus and thereby increase the compensation speed of the output voltage to stabilize the output voltage.

In order to make the aforementioned features and advantages of the invention comprehensible, embodiments accompanied with figures are described in detail below.

BRIEF DESCRIPTION OF THE DRAWINGS

The accompanying drawings constitute a part of this specification. The drawings illustrate exemplary embodiments of the invention and, together with the description, serve to explain the principles of the invention.

DESCRIPTION OF THE EMBODIMENTS

Figure 1:
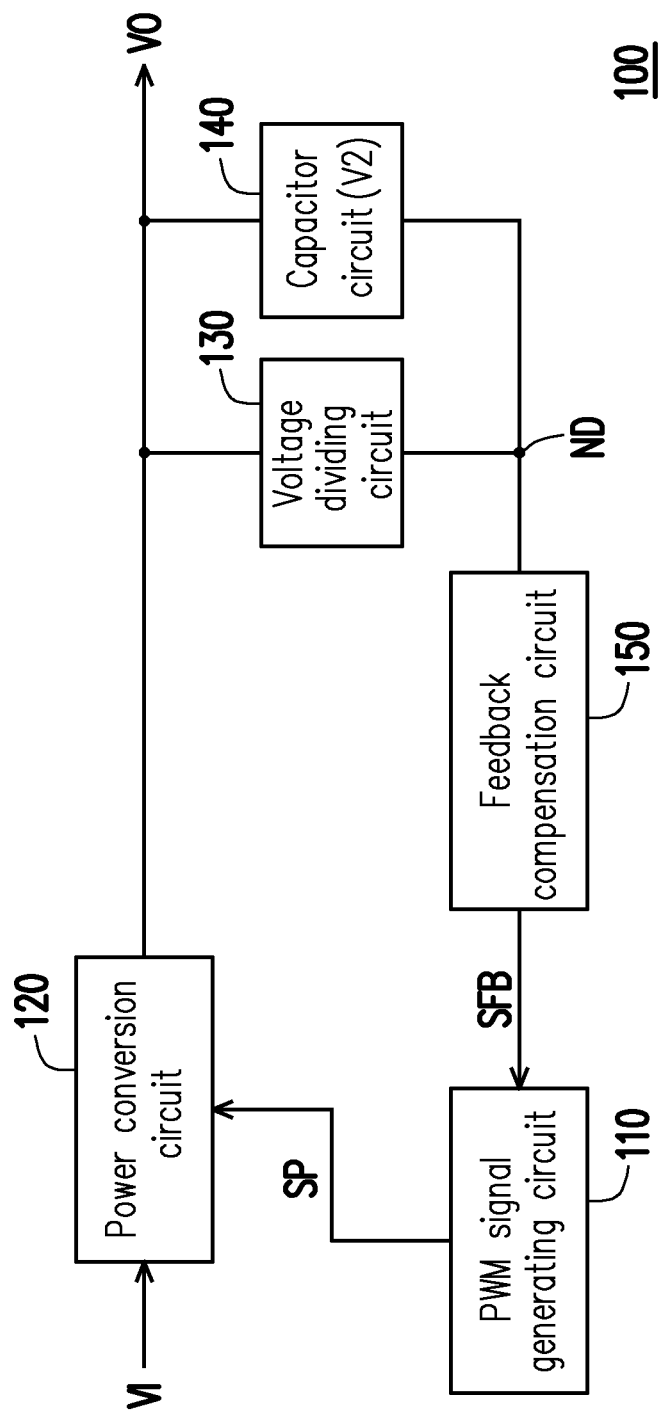
FIG. 1 is block schematic diagram of a power supply apparatus according to an embodiment of the invention.

FIG. 1 is block schematic diagram of a power supply apparatus according to an embodiment of the invention. Referring to FIG. 1, the power supply apparatus 100 may be, for example, a variable frequency regulated power supply apparatus, but is not limited thereto. The power supply apparatus 100 may include a PWM signal generating circuit 110, a power conversion circuit 120, a voltage dividing circuit 130, a capacitor circuit 140, and a feedback compensation circuit 150, but is not limited thereto. The PWM signal generating circuit 110 is configured to generate a PWM signal SP according to a feedback signal SFB, and may modulate at least one of the frequency and the duty cycle of the PWM signal SP according to the feedback signal SFB. The power conversion circuit 120 is coupled to the PWM signal generating circuit 110 to receive the PWM signal SP. The power conversion circuit 120 may convert an input voltage VI into an output voltage VO according to the PWM signal SP.

The voltage dividing circuit 130 is coupled to the power conversion circuit 120 to receive the output voltage VO, and divides the output voltage VO to generate a first voltage V1 to the node ND. The capacitor circuit 140 is coupled to the power conversion circuit 120 to receive the output voltage VO, and configured to generate a second voltage V2 to the node ND according to the output voltage VO in response to a voltage change of the output voltage VO. The feedback compensation circuit 150 is coupled to the node ND and the PWM signal generating circuit 110, and configured to generate the feedback signal SFB based on the voltage of the node ND and a reference voltage VREF.

In details, The feedback compensation circuit 150 generates the feedback signal SFB based on the first voltage V1 generated by the voltage dividing circuit 130 and the reference voltage VREF before the output voltage VO is ready, so that the PWM signal generating circuit 110 generates the PWM signal SP according to the feedback signal SFB to control the power conversion circuit 120 to generate the output voltage VO. After the output voltage VO is ready, the feedback compensation circuit 150 generates the feedback signal SFB based on the second voltage V2 generated by the capacitor circuit 140 and the reference voltage VREF, and the PWM signal generating circuit 110 may modulate at least one of the frequency and the duty cycle of the PWM signal SP according to the feedback signal SFB, so that the power conversion circuit 120 provides the stable output voltage VO according to the PWM signal SP.

It may be understood that, based on the characteristic that the response speed of the capacitor circuit 140 to the voltage change is high, the capacitor circuit 140 may rapidly provide the second voltage V2 to the feedback compensation circuit 150 in response to the voltage change of the output voltage VO, so as to increase the feedback response speed of the power supply apparatus 100, and thereby promote the compensation speed to the output voltage VO and provide the stable output voltage VO.

In an embodiment of the invention, the PWM signal generating circuit 110 may be implemented by adopting an existing PWM integrated circuit, but is not limited thereto.

In an embodiment of the invention, the power conversion circuit 120 may be implemented by adopting various types of isolated power conversion circuits, but is not limited thereto.

In an embodiment of the invention, the fact that the output voltage is ready, for example, may be that the voltage value of the output voltage VO has already increased to a preset voltage value for a period of time, but the invention is not limited thereto. The preset voltage value may be set according to practical application.

Figure 2:
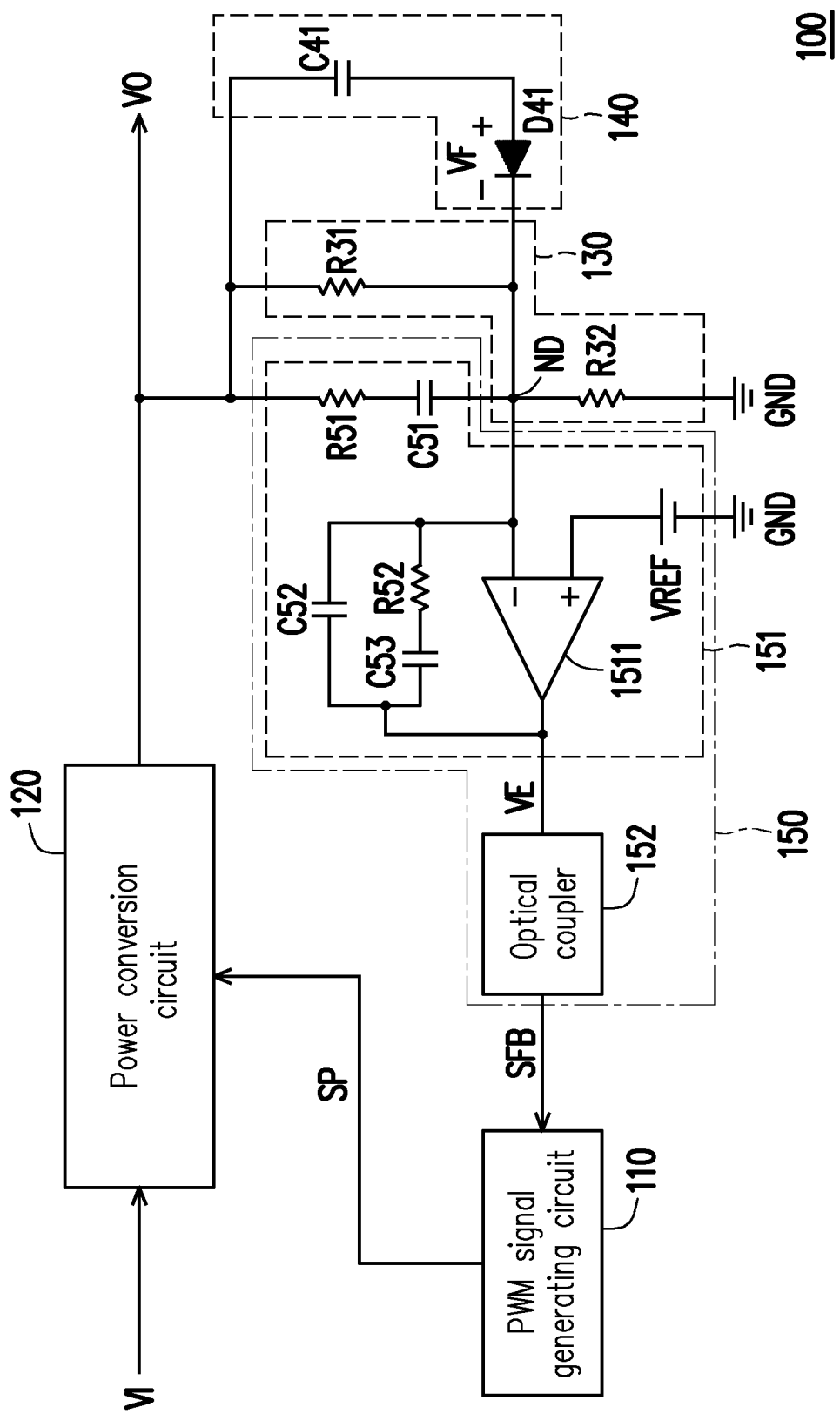
FIG. 2 is a schematic diagram of a circuit architecture of the power supply apparatus of FIG. 1 according to an embodiment of the invention.

FIG. 2 is a schematic diagram of a circuit architecture of the power supply apparatus of FIG. 1 according to an embodiment of the invention. Referring to FIG. 2, the voltage dividing circuit 130 may include a first resistor R31 and a second resistor R32, but is not limited thereto. A first terminal of the first resistor R31 receives the output voltage VO. A second terminal of the first resistor R31 is coupled to the node ND. A first terminal of the second resistor R32 is coupled to the node ND. A second terminal of the second resistor R32 is coupled to a ground terminal GND.

The capacitor circuit 140 may include a capacitor C41 and a first diode D41, but is not limited thereto. A first terminal of the capacitor C41 receives the output voltage VO. An anode of the first diode D41 is coupled to a second terminal of the capacitor C41. A cathode of the first diode D41 is coupled to the node ND.

The feedback compensation circuit 150 may include an error amplifying circuit 151 and an optical coupler 152, but is not limited thereto. The error amplifying circuit 151 is coupled to the node ND, and configured to amplify a difference value between the voltage of the node ND and the reference voltage VREF to generate an error amplifying signal VE. The optical coupler 152 is coupled between the error amplifying circuit 151 and the PWM signal generating circuit 110, and configured to generate the feedback signal SFB according to the error amplifying signal VE and provide the feedback signal SFB to the PWM signal generating circuit 110.

In an embodiment of the invention, the error amplifying circuit 151 may include an operational amplifier 1511, a first resistor R51, a first capacitor C51, a second capacitor C52, a second resistor R52 and a third capacitor C53, but is not limited thereto. An inverting input terminal of the operational amplifier 1511 is coupled to the node ND. A non-inverting input terminal of the operational amplifier 1511 receives the reference voltage VREF. An output terminal of the operational amplifier 1511 is coupled to the optical coupler 152 to provide the error amplifying signal VE. A first terminal of the first resistor R51 receives the output voltage VO. The first capacitor C51 is coupled between a second terminal of the first resistor R51 and the node ND. The second capacitor C52 is coupled between the node ND and an output terminal of the operational amplifier 1511. A first terminal of the second resistor R52 is coupled to the node ND. The third capacitor C53 is coupled between a second terminal of the second resistor R52 and the output terminal of the operational amplifier 1511.

Before the output voltage VO is ready, the first resistor R31 and the second resistor R32 may divide the output voltage VO to provide a first voltage V1 to the node ND (that is, the first voltage V1 is established at the node ND), where the first voltage V1 is as shown in formula (1).

$$V1 = \frac{R32}{R31 + R32} \cdot VO \qquad \text{formula (1)}$$

After the output voltage VO is ready, the first diode D41 may be turned on in response to the voltage change of the output voltage VO, and therefore, the capacitor C41, the first diode D41 and the second resistor R32 will form a charging current path, so that the capacitor C41 is charged according to the output voltage VO, and may provide the second voltage V2 to the node ND (that is, the second voltage V2 is established at the node ND) through the first diode D41, where the second voltage V2 is equal to a difference value between the output voltage VO and a cut-in voltage VF of the first diode D41, as shown in formula (2).

$$V2=VO-VF \qquad \text{formula (2)}$$

Furthermore, when the output voltage VO is steady, the voltage of the node ND is equal to the reference voltage VREF, and the first diode D41 is cut off.

It may be understood that, because the response speed of the capacitor C41 to the voltage change is higher than that of the resistors (that is, the first resistor R31 and the second resistor R32), the capacitor C41 may rapidly provide the second voltage V2 to the feedback compensation circuit 150 in response to the voltage change of the output voltage VO, so as to increase the feedback response speed of the power supply apparatus 100 to rapidly stabilize the output voltage VO.

In an embodiment of the invention, the resistance value of the first resistor R31 is extremely greater than the resistance value of the first resistor R51. For example, the resistance value of the first resistor R31 is greater than the resistance value of the first resistor R51 by more than ten times, but the invention is not limited thereto.

In an embodiment, the resistance value of the first resistor R51 is 10KΩ, the capacitance value of the first capacitor C51 is 1 nF, the resistance value of the first resistor R31 is 68.1KΩ, the resistance value of the second resistor R32 is 19.2KΩ, and the capacitance value of the capacitor C41 is 100 nF, but the invention is not limited thereto.

In an experimental result of the foregoing embodiment of the invention, when the output voltage VO changes, if the feedback compensation circuit 150 generates the feedback signal SFB to the PWM signal generating circuit 110 according to the second voltage V2 generated by the capacitor circuit 140 and the reference voltage VREF, the feedback response time delay of the power supply apparatus 100 is 568 milliseconds. Oppositely, when the output voltage VO changes, if the feedback compensation circuit 150 generates the feedback signal SFB to the PWM signal generating circuit 110 according to the first voltage V1 generated by the voltage dividing circuit 130 and the reference voltage VREF, the feedback response time delay of the power supply apparatus 100 is 1966 milliseconds. It is known from the experiment result that, the capacitor circuit 140 may effectively increase the feedback response speed of the power supply apparatus 100.

Figure 3:
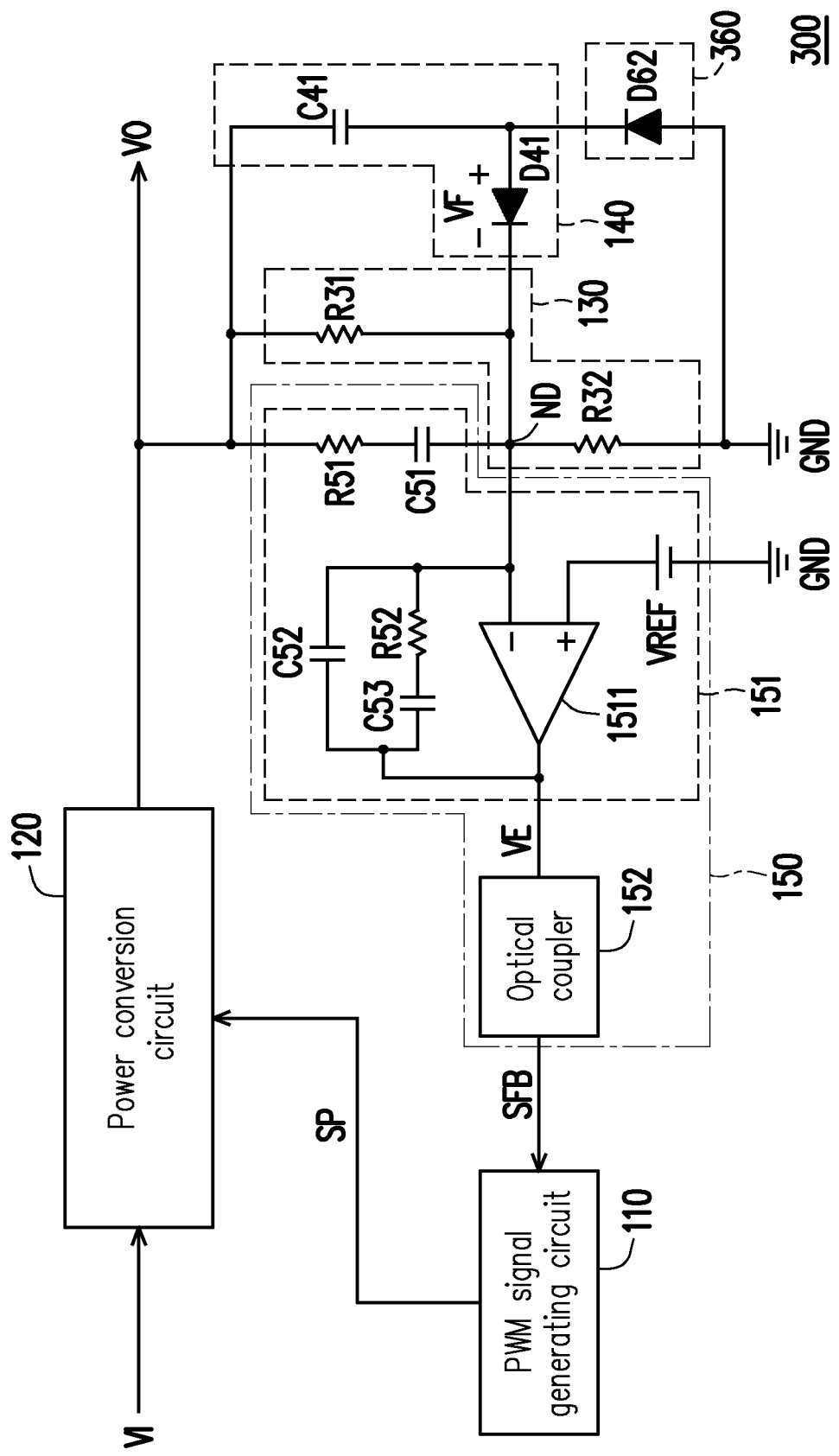
FIG. 3 is a schematic diagram of a circuit architecture of a power supply apparatus according to another embodiment of the invention.

FIG. 3 is a schematic diagram of a circuit architecture of a power supply apparatus according to another embodiment of the invention. Please refer to FIG. 2 and FIG. 3 together. The power supply apparatus 300 of FIG. 3 is similar to the power supply apparatus 100 in FIG. 2, and the difference between the two is that: the power supply apparatus 300 of FIG. 3 further includes a discharge circuit 360. The discharge circuit 360 is coupled between the second terminal of the capacitor C41 and the ground terminal GND. When the voltage of the node ND is equal to the reference voltage VREF (that is, the output voltage VO is stable), electrical energy stored in the capacitor C41 is discharged through the discharge circuit 360, so as to prevent the electrical energy stored in the capacitor C41 from causing the first capacitor C41 and the first capacitor C51 as well as the second capacitor C52 to generate resonance.

Figure 4B:
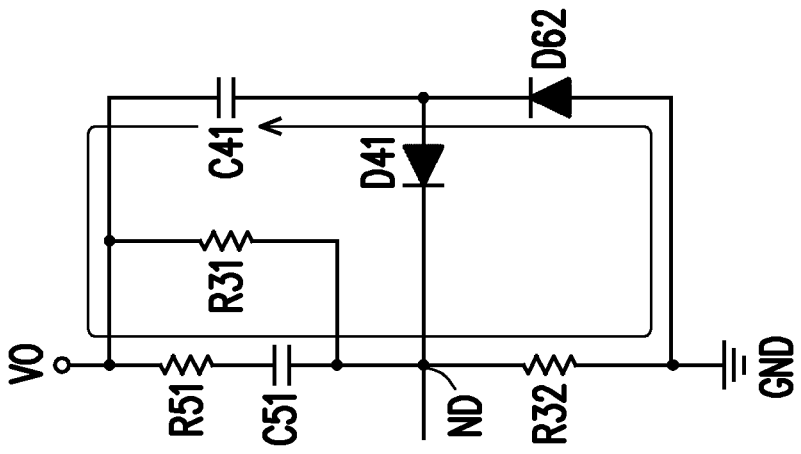
FIG. 4B is a discharge schematic diagram of a capacitor circuit according to an embodiment of the invention.
Figure 4A:
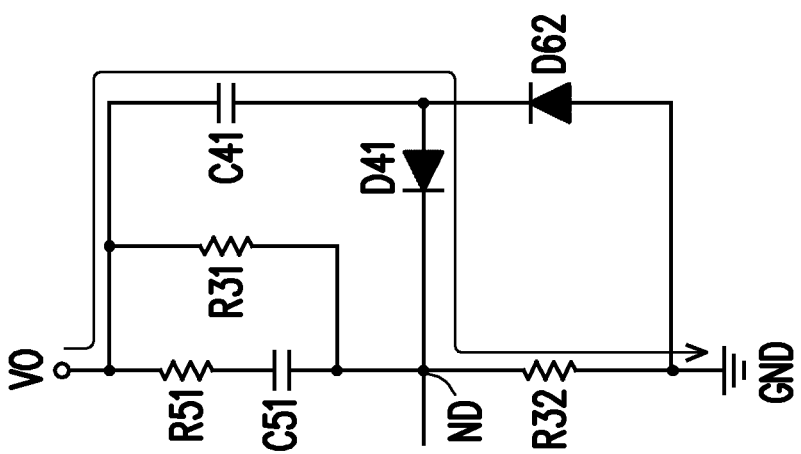
FIG. 4A is a charge schematic diagram of a capacitor circuit according to an embodiment of the invention.

In an embodiment of the invention, as shown in FIG. 3, the discharge circuit 360 may include a second diode D62. An anode of the second diode D62 is coupled to the ground terminal GND, and a cathode of the second diode D62 is coupled to the second terminal of the capacitor C41. After the output voltage VO is ready, the first diode D41 may be turned on in response to the voltage change of the output voltage VO, and the second diode D62 may be cut off in response to the voltage change of the output voltage. Therefore, the capacitor C41, the first diode D41 and the second resistor R32 will form a charging current path, so that the capacitor C41 is charged according to the output voltage VO, and provides the second voltage V2 to the node ND through the first diode D41, as shown in FIG. 4A.

When the voltage of the node ND is equal to the reference voltage VREF (that is, the output voltage VO is stable), the first diode D41 is cut off and the second diode D62 is turned on, and therefore, the electrical energy stored in the capacitor C41 will be discharged through the second diode D62. In details, as shown in FIG. 4B, when the voltage of the node ND is equal to the reference voltage VREF, the second diode D62, the capacitor C41, the first resistor R51, the first capacitor C51 and the second resistor R32 will form a discharging current path, so as to dissipate the electrical energy stored in the capacitor C41.

In addition, other implementation details and operations of the power supply apparatus 300 of FIG. 3 may refer to foregoing related illustrations of FIG. 1 and FIG. 2, and are not further described herein.

Figure 5:
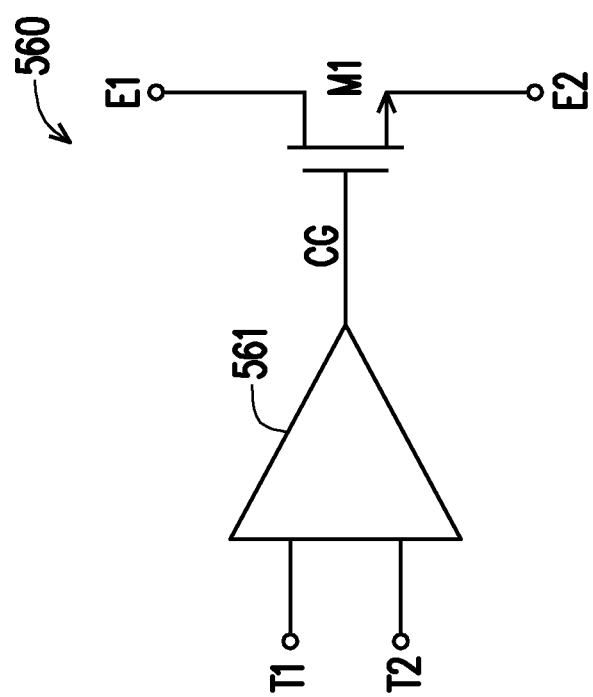
FIG. 5 is a schematic diagram of a circuit architecture of a discharge circuit according to an embodiment of the invention.

FIG. 5 is a schematic diagram of a circuit architecture of a discharge circuit according to an embodiment of the invention, which may be used for replacing the discharge circuit 360 shown in FIG. 3. Referring to FIG. 3 and FIG. 5 together, the discharge circuit 560 of FIG. 5 may include a comparator 561 and a transistor M1. An input terminal T1 of the comparator 561 is coupled to the node ND of FIG. 3. An input terminal T2 of the comparator 561 receives the reference voltage VREF of FIG. 3. The comparator 561 may compare the voltage of the node ND with the reference voltage VREF to generate a control signal CG. A first terminal E1 and a second terminal E2 of the transistor M1 are respectively coupled to the second terminal of the capacitor C41 and the ground terminal GND of FIG. 3. A control terminal of the transistor M1 is coupled to the comparator 561 to receive the control signal CG. The transistor M1 is controlled by the control signal CG to be turned on and turned off.

When the voltage of the node ND is equal to the reference voltage VREF (that is, when the output voltage VO of FIG. 3 is stable), the transistor M1 is turned on in response to the control signal CG, so that electrical energy stored in the capacitor C41 is discharged through the transistor M1. Moreover, when the voltage of the node ND is not equal to the reference voltage VREF (that is, when the output voltage VO of FIG. 3 is not stable), the transistor M1 is turned off in response to the control signal CG, so that the capacitor C41 stops being discharged.

To sum up, in the power supply apparatus provided by the embodiments of the invention, the capacitor circuit may rapidly provide the second voltage to the feedback compensation circuit in response to the voltage change of the output voltage, so as to increase the feedback response speed of the power supply apparatus, and thereby increase the compensation speed of the output voltage to stabilize the output voltage.

Although the invention has been disclosed as above through the embodiments, the embodiments are not intended to limit the invention, any person of ordinary skill in the art can make some alternations and modifications without deviating from the spirit and scope of the invention, and therefore, the protection scope of the invention should be subject to the appended claims.

What is claimed is:

1. A power supply apparatus, comprising:
   a pulse width modulation (PWM) signal generating circuit, configured to generate and modulate a PWM signal according to a feedback signal;
   a power conversion circuit, coupled to the PWM signal generating circuit to receive the PWM signal, and configured to convert an input voltage into an output voltage according to the PWM signal;
   a voltage dividing circuit, comprising a second resistor and a resistor, coupled to the power conversion circuit to receive the output voltage, and configured to divide the output voltage to generate a first voltage to a node;
   a capacitor circuit, coupled to the power conversion circuit to receive the output voltage, and configured to generate a second voltage to the node according to the output voltage in response to a voltage change of the output voltage, wherein the capacitor circuit comprises a capacitor, wherein a first terminal of the capacitor receives the output voltage, and a first diode, wherein an anode of the first diode is coupled to a second terminal of the capacitor and a cathode of the first diode is coupled to the node;
   a feedback compensation circuit, coupled to the node and the PWM signal generating circuit, generating the feedback signal based on the first voltage and a reference voltage before the output voltage is ready, and generating the feedback signal based on the second voltage and the reference voltage after the output voltage is ready; and a discharge circuit, coupled between the second terminal of a capacitor and a ground terminal, wherein an electrical energy stored in the capacitor is discharged through the discharge circuit when a voltage of the node is equal to the reference voltage, wherein the discharge circuit comprises a second diode, wherein an anode of the second diode is coupled to the ground terminal, and a cathode of the second diode is coupled to the second terminal of the capacitor, wherein when the voltage of the node is equal to the reference voltage, the first diode is cut off, the second diode, the capacitor, a first resistor, a first capacitor and the resistor form a discharging current path to dissipate the electrical energy stored in the capacitor.

2. The power supply apparatus according to claim 1, wherein:

after the output voltage is ready, the first diode is turned on in response to the voltage change of the output voltage, so that the capacitor is charged according to the output voltage, and provides the second voltage to the node through the first diode, wherein the second voltage is equal to a difference value between the output voltage and a cut-in voltage of the first diode.

3. The power supply apparatus according to claim 2, wherein the first diode is cut off when the voltage of the node is equal to the reference voltage.

4. The power supply apparatus according to claim 1, wherein the second diode is cut off in response to the voltage change of the output voltage after the output voltage is ready; and after the voltage of the node is equal to the reference voltage, the second diode is turned on, and the discharge circuit discharges the electrical energy stored in the capacitor to the ground terminal.

5. The power supply apparatus according to claim 1, wherein the voltage dividing circuit comprises:

the second resistor, wherein a first terminal of the second resistor receives the output voltage, and a second terminal of the second resistor is coupled to the node; and the resistor, wherein a first terminal of the resistor is coupled to the node, and a second terminal of the resistor is coupled to the ground terminal.

6. The power supply apparatus according to claim 1, wherein the feedback compensation circuit comprises:

an error amplifying circuit, coupled to the node, and configured to amplify a difference value between a voltage of the node and the reference voltage to generate an error amplifying signal; and an optical coupler, coupled between the error amplifying circuit and the PWM signal generating circuit, and configured to generate the feedback signal according to the error amplifying signal and provide the feedback signal to the PWM signal generating circuit.

7. The power supply apparatus according to claim 6, wherein the error amplifying circuit comprises:

an operational amplifier, wherein an inverting input terminal of the operational amplifier is coupled to the node, a non-inverting input terminal of the operational amplifier receives the reference voltage, and an output terminal of the operational amplifier is coupled to the optical coupler to provide the error amplifying signal;

the first resistor, wherein a first terminal of the first resistor receives the output voltage;

the first capacitor, coupled between a second terminal of the first resistor and the node;

a second capacitor, coupled between the node and the output terminal of the operational amplifier;

the second resistor, wherein a first terminal of the second resistor is coupled to the node; and a third capacitor, coupled between a second terminal of the second resistor and the output terminal of the operational amplifier.

8. The power supply apparatus according to claim 1, wherein:

after the output voltage is ready, the first diode is turned on in response to the voltage change of the output voltage, and the capacitor, the first diode and the fourth resistor form a charging current path, so that the capacitor is charged according to the output voltage, and provides the second voltage to the node through the first diode.

* * * * *